(12) United States Patent
Coyne et al.

(10) Patent No.: US 6,880,318 B2
(45) Date of Patent: Apr. 19, 2005

(54) ROOF-RAKER

(75) Inventors: Joseph Edward Coyne, Hilton Head, SC (US); Richard Charles Coyne, New York, NY (US)

(73) Assignee: Joseph E. Coyne, Hilton Head, SC (US)

( * ) Notice: Subject to any disclaimer, the term of this patent is extended or adjusted under 35 U.S.C. 154(b) by 71 days.

(21) Appl. No.: 10/665,051

(22) Filed: Sep. 18, 2003

(65) Prior Publication Data

US 2005/0060977 A1 Mar. 24, 2005

(51) Int. Cl.$^7$ ................................................ A01D 7/06
(52) U.S. Cl. .............................. 56/400.12; 56/400.21; 56/400.18; 172/378
(58) Field of Search ................................ 172/378, 371, 172/381, 749, 750, 753; 56/400.01, 400.16, 400.21, 400.17, DIG. 21, 400.11, 400.12, 400.18

(56) References Cited

U.S. PATENT DOCUMENTS

| | | | | |
|---|---|---|---|---|
| RE17,606 E | * | 2/1930 | Withington | 56/400.17 |
| 1,887,480 A | * | 11/1932 | Horstman | 56/400.17 |
| 1,909,754 A | * | 5/1933 | Carlson | 56/400.17 |
| 2,205,827 A | * | 6/1940 | Brooke | 56/400.17 |
| 2,310,322 A | * | 2/1943 | Semler et al. | 56/400.17 |
| 2,488,802 A | * | 11/1949 | Canalizo | 56/400.17 |
| 2,510,936 A | * | 6/1950 | Speer et al. | 56/400.17 |
| 2,707,366 A | * | 5/1955 | Gartner | 56/400.08 |
| 2,720,745 A | * | 10/1955 | Melvin | 56/400.17 |
| 2,794,312 A | * | 6/1957 | Finkes | 56/400.17 |
| 3,091,790 A | | 6/1963 | Schroeder | |
| 3,654,754 A | * | 4/1972 | Scoggin et al. | 56/400.17 |
| 3,701,243 A | * | 10/1972 | Durkee | 56/400.18 |
| 3,707,835 A | * | 1/1973 | McNally et al. | 56/400.01 |
| 3,724,188 A | * | 4/1973 | Eads | 56/400.17 |
| 3,744,229 A | * | 7/1973 | Bull | 56/400.17 |
| RE28,764 E | * | 4/1976 | Durkee | 56/400.15 |
| 4,057,953 A | * | 11/1977 | Rugg | 56/400.17 |
| 4,215,528 A | * | 8/1980 | Fodor | 56/400.17 |
| 4,232,422 A | * | 11/1980 | Fellmann | 16/427 |
| 4,593,520 A | | 6/1986 | Krizman | |
| 4,791,780 A | | 12/1988 | Phillips | |
| 4,831,815 A | * | 5/1989 | Bonnes | 56/400.17 |
| 5,022,221 A | * | 6/1991 | Bonnes et al. | 56/400.17 |
| 5,099,638 A | * | 3/1992 | Bass | 56/400.16 |
| 5,305,591 A | * | 4/1994 | Gibson, Jr. | 56/400.1 |
| 5,425,226 A | * | 6/1995 | Kaufman | 56/400.06 |
| 5,467,590 A | * | 11/1995 | Mencarelli et al. | 56/400.17 |
| 5,501,069 A | * | 3/1996 | Lentz | 56/400.1 |
| 5,603,584 A | * | 2/1997 | Schuele | 403/371 |

(Continued)

FOREIGN PATENT DOCUMENTS

| | | | | |
|---|---|---|---|---|
| GB | 2244197 A | * | 11/1991 | A01D/7/06 |

*Primary Examiner*—Thomas B. Will
*Assistant Examiner*—Alexandra K. Pechhold

(57) ABSTRACT

A roof-raking device designed to safely and efficiently remove pine straw and leaf debris from roofs of houses. When attached to a lightweight telescopic or other long pole this device can be used by a person standing at ground level or on a ladder, eliminating the risk of climbing and walking on a pitched roof. Formed of a flexible, resilient material our rake-head is a one-piece injection molded device comprising a plurality of deeply curved, reinforced tines, a central housing support structure and a female flange fitting. The tines are of varying length, width, thickness and curve radius. When slight downward hand pressure is applied to the upper surface of a connecting pole the flexible self-adjusting tines form themselves evenly to any horizontal pitched roof surface, and when applied to a V-shaped roof angle where two roof planes meet, the tines flex and form themselves to both roof planes simultaneously. It is in these V-shaped angle roof areas where pine straw and leaf debris tend to gather and remain, causing costly maintenance problems for a homeowner if not removed.

1 Claim, 5 Drawing Sheets

U.S. PATENT DOCUMENTS

| | | | | |
|---|---|---|---|---|
| 5,713,193 A | * | 2/1998 | Stapley et al. | 56/400.08 |
| 5,927,058 A | * | 7/1999 | Hsu | 56/400.16 |
| 6,018,894 A | | 2/2000 | Whitehead | |
| 6,131,381 A | * | 10/2000 | Milbury | 56/400.17 |
| 6,339,919 B1 | * | 1/2002 | Hsu | 56/400.2 |
| 6,381,938 B1 | * | 5/2002 | Kelly | 56/400.16 |
| 6,640,531 B1 | * | 11/2003 | Riley et al. | 56/400.01 |
| 2002/0095926 A1 | * | 7/2002 | Hsu | 56/400.05 |

* cited by examiner

ROOF-RAKER

BACKGROUND OF THE INVENTION

1. Field of the Invention

Our invention relates to roof maintenance, specifically to an improved self-adjusting roof rake and an improved method of removing pine straw and leaf debris from roofs of houses.

2. State of the Prior Art

As can be seen by reference to known raking implements covered by U.S. patents, the prior art is replete with myriad and diverse rake constructions. While all of the aforementioned prior art constructions are more than adequate for the basic purpose and function for which they have been specifically designed, they are uniformly deficient with respect to their ability to efficiently and safely remove pine straw and leaf debris from pitched roof surfaces, particularly from recessed V-shaped roof areas where two piched roof planes meet.

Most of the known raking implements covered by U.S. patents are designed for ground use by a person standing at ground level. Such lawn and leaf rakes are described as having a plurality of tines or teeth. Some of these rakes are fan-shaped, others have a horizontal crosshead or bar from which tines or teeth extend in a straight line. A few examples of fan-shaped rakes are; E. A. Canalizo, U.S. Pat. No. 2,488,802, J. Horstman, U.S. Pat. No. 1,887,480 and Rugg, U.S. Pat. No. 4,057,953. The design and structure of such fan-shaped rakes usually include a restricting bar across the body of the tines which maintain spacing of the tines but limit their flexibility. Such limited flexibility makes such rakes unsuitable for removal of pine straw and leaf debris from roof surfaces, particularly from recessed V-shaped roof areas where two pitched roof planes meet. And it is in such V-shaped angled roof areas where pine straw and leaf debris tend to gather and remain.

A few examples of crosshead rakes, which feature a plurality of tines or teeth of uniform length and extend from a rigid horizontal bar or cross-piece are; Riley II et al, U.S. Pat. No. 6,640,531 B1, Milbury, U.S. Pat. No. 6,131,381 and Kaufman, U.S. Pat. No. 5,425,226. Such rakes, because of their complete lack of flexibility and rigid construction are unsuitable for the purpose of removing pine straw and leaf debris safely and efficiently from roofs. The pointed and often sharp teeth of such rakes have the added disadvantage of being able to cause damage to roof surfaces.

There are three known patents covering rakes designed for use on roofs of houses. One is Phillips, U.S. Pat. No. 4,791,780, specifically designed to remove scraps and pieces of construction materials such as wood, metal and shingle debris. This raking device has two sets of rigid tines facing in opposite directions from each other. This raking implement requires an operator, while standing on a roof, to move the tines in one direction or an opposite direction by turning a control mechanism in the rake handle. The design and structure of this device make it completely unsuitable to remove pine straw and leaf debris efficiently, particularly from recessed V-shaped roof areas where two pitched roof planes meet.

The other two known roof-rake patents are L. A. Schroeder, U.S. Pat. No. 3,091,790 and Whitehead et al U.S. Pat. No. 6,018,894 both of which cover raking devices designed to remove snow and ice from roofs of houses. The rigid construction and horizontal blade design of these devices, which more closely resemble a shovel than a rake, are intended, to scrape and slide snow and ice down and off a roof. Such design renders such devices impractical and unusable for the purpose of removing pine straw and leaf debris from roofs of houses.

None of the raking devices described or referenced herein, or any others we are aware of, were either designed or intended to remove pine straw and leaf debris from roofs of houses. Nor, based on their own detailed descriptions, could they reasonably be expected to perform such a function safely and efficiently.

Yet many homeowners, for want of something better, continue to use some of these rakes to try to clear their roofs of pine straw and leaf debris. The failure of such rakes to perform safely and efficiently is especially obvious when trying to clear such debris from V-shaped roof areas where two pitched roof planes meet.

OBJECTS AND ADVANTAGES

Homeowners have a choice of four options when confronted with the problem of removing pine straw and leaf debris that gathers and remains on roofs of houses;

1) use a lawn or leaf rake
2) use a mechanical leaf-blower
3) hire someone to remove pine straw and leaf debris
4) ignore the problem and allow pine straw and leaf debris to gather and remain on roof.

The primary object of the present invention, when attached to a lightweight telescopic pole, is to provide a safer, easier, more efficient and economical method of removing pine straw and leaf debris from roofs of houses. Accordingly, several objects and advantages are;

a) provide a roof-raking device with deeply curved self-adjusting tines capable of flexing and forming to all types of roof surfaces, including recessed V-shaped roof areas where two pitched roof planes meet b) provide a roof-raking device that can be operated by a person while standing on the ground or on a ladder c) provide an easy to handle roof-raking device that can be operated safely by a person of almost any age, from young teen-agers to elderly retirees d) provide a roof-raking device that eliminates or minimizes the risk of serious personal injury that can result from climbing and walking up, down and across a pitched roof e) provide a roof-raking device having a plurality of tines with convex tips designed to avoid damage to roof surfaces f) provide a roof-raking device that eliminates possible damage to roof surfaces caused by excessive walking g) provide a one-piece injection molded device that is economical to produce and does not require adjustment, repair or replacement of parts h) provide a roof-raking device that allows a homeowner to maintain a healthy attractive roof that is free and clear of pine straw and leaf debris that can cause mildew, mold and ugly discoloration if not removed i) provide a roof-raking device that can save homeowners hundreds of dollars annually in service costs related to periodic removal of pine straw and leaf debris from roofs, and hundreds more in service costs related to chemical cleaning or powerwashing of roof stains j) provide a roof-raking device whose use, over time, can affest the condition, appearance and value of a house.

k) provide a roof-raking device that can help prevent roof rot and decay that can ultimately lead to leaks and costly repairs.

SUMMARY

A roof-raking device featuring a plurality of deeply curved self-adjusting tines capable of flexing and forming to all types of roof surfaces and angles. Designed to be attached to a lightweight telescopic pole, our device can be operated safely from ground level by almost any age, from young teen-agers to elderly retirees.

DETAILED DESCRIPTION OF DRAWINGS

A unique and novel feature of our roof-raking invention is inherent in the design and structure of the flexible, deeply curved tines 2–18 which form an elongated diamond pattern or wedge-shaped configuration, i.e., the positional relationship of the tine tips, having the capability of aligning to any horizontal pitched roof plane, as well as the capability of flexing and forming simultaneously to both sides of any V-shaped angles where two roof planes meet.

Figure 1:
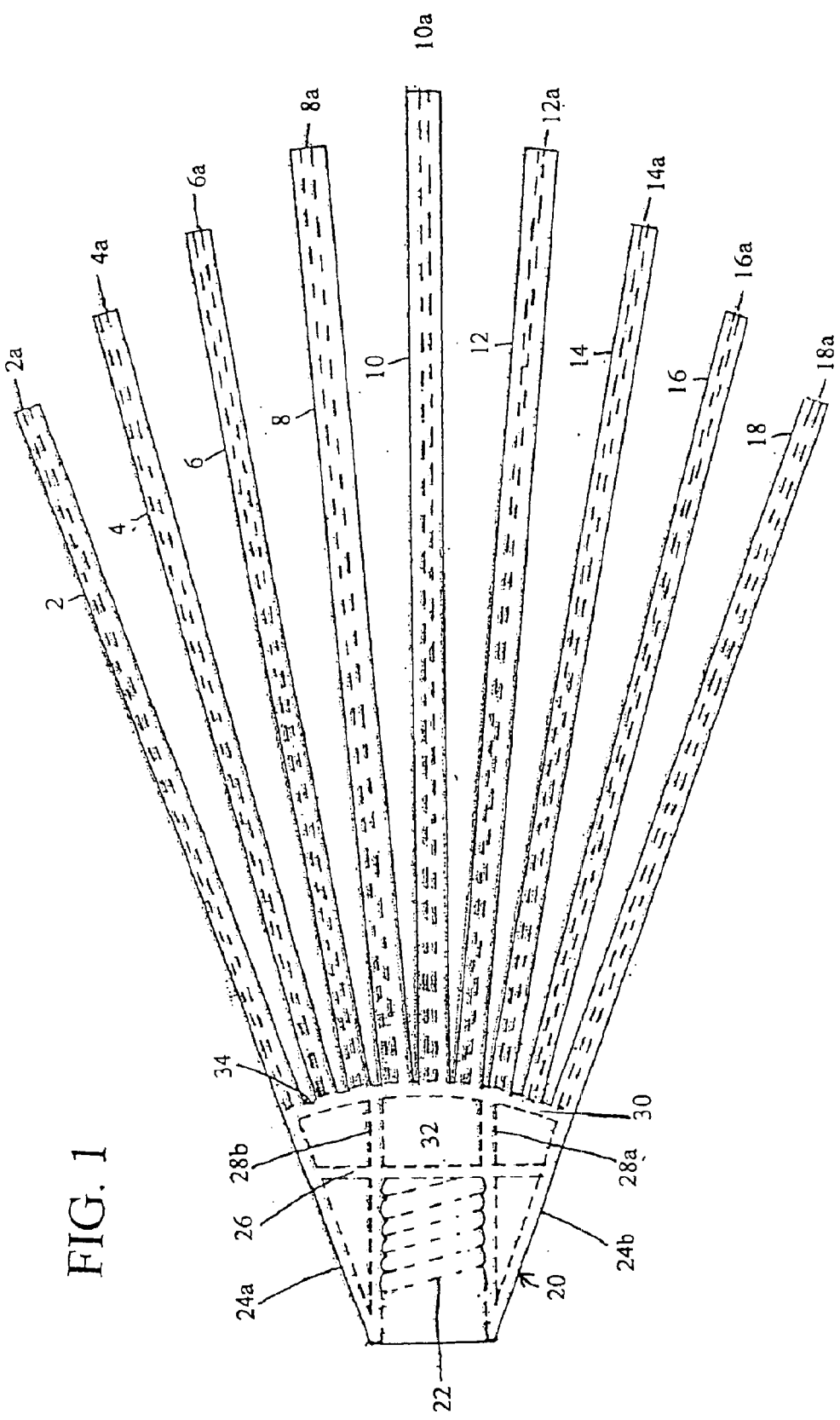
FIG. 1 . . . is a top plan view of The ROOF-RAKER showing the central housing support structure, underlying interior support walls, female flange fitting and tines with underlying support ridges.
Figure 2:
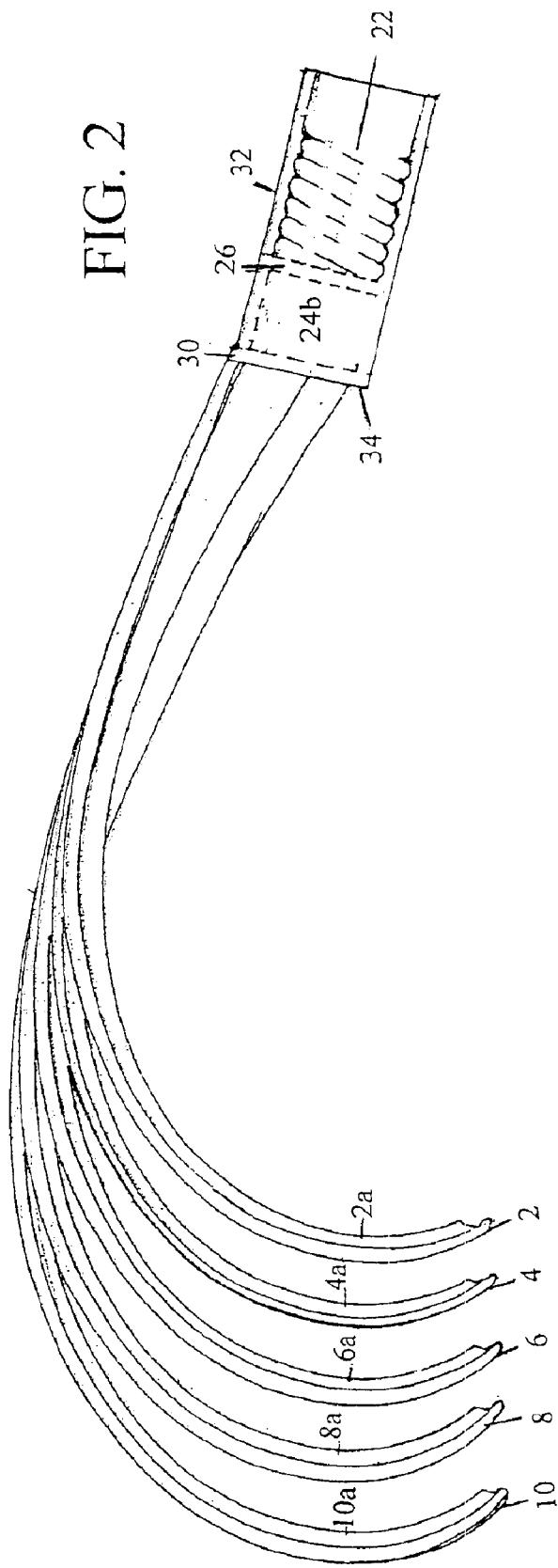
FIG. 2 . . . is a side view showing the top surface plate, front wall, interior support wall, female flange fitting, deeply curved tines and lower support ridges of the tines.
Figure 3:
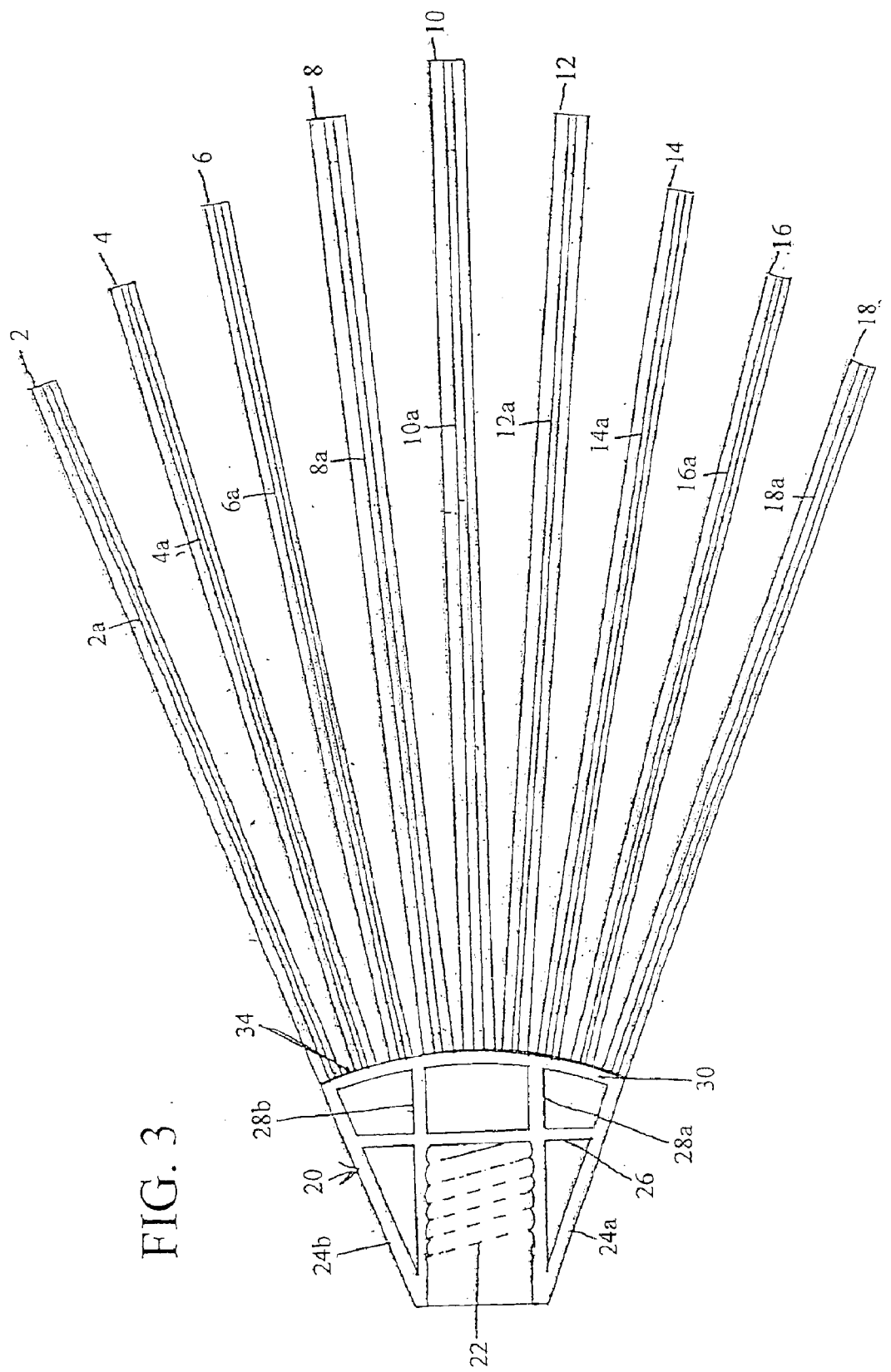
FIG. 3 . . . is a bottom view showing convex front wall, interior and exterior support walls and female flange fitting of central housing support structure, plus approximate length and width of tines and lower support ridges of tines.
Figure 4:
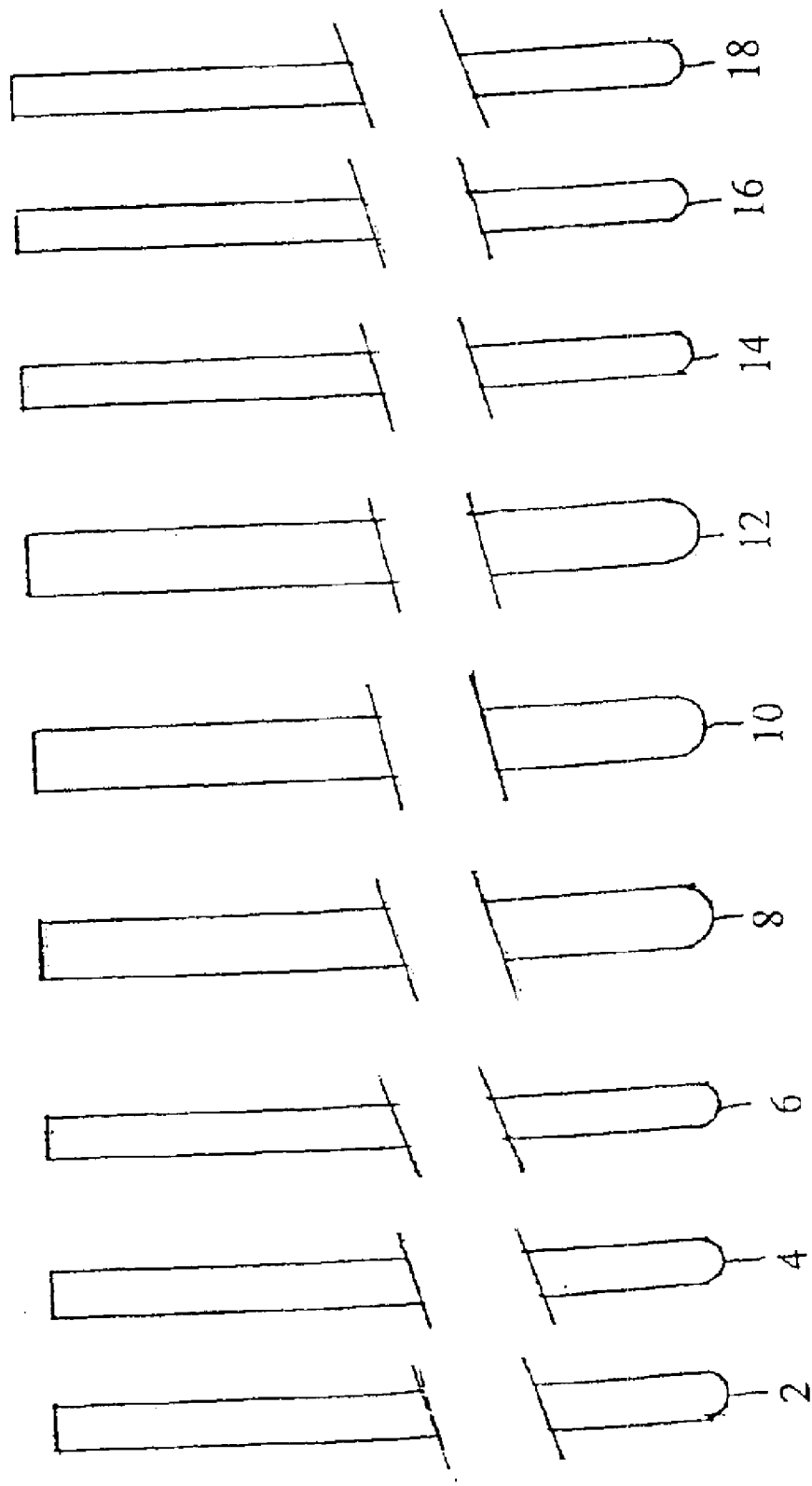
FIG. 4 . . . shows only front view of convex tine tips
Figure 5:
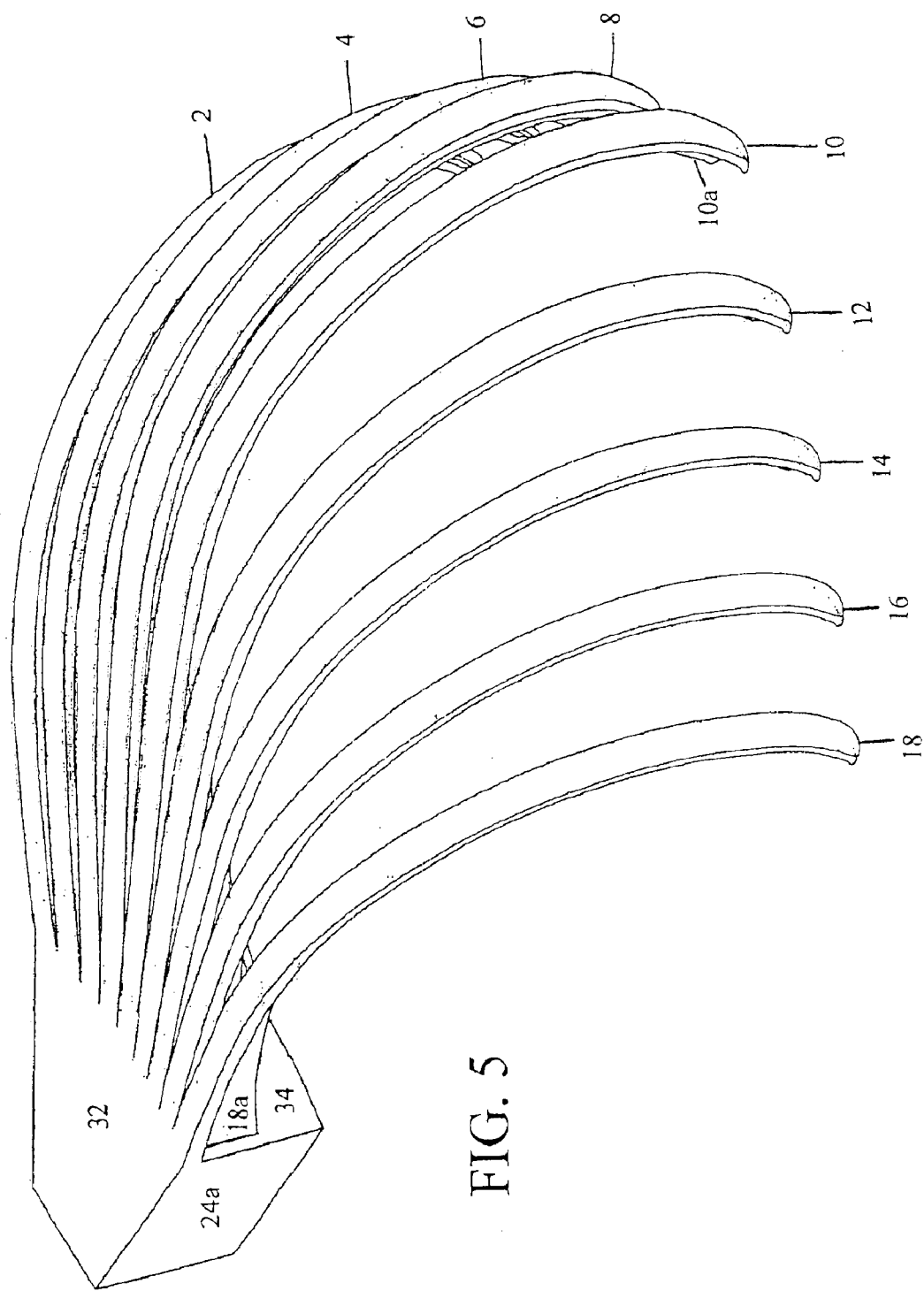
FIG. 5 . . . is ¾ overhead perspective drawing showing the central housing support structure and tines.

The ROOF-RAKER is a one-piece injection molded device fabricated of flexible, resilient material having molecular shape memory. The rake-head has a central housing support structure 20 (FIGS. 1, 2, 3, 4, 5,). The central housing support structure 20 has two non-parallel external side support walls 24a and 24b (FIGS. 1, 2, 3, 5.) and one convex front support wall 30 (FIGS. 1, 2, 3, 5,). There are two interior latitudinal support walls 28a and 28b (FIGS. 1, 2.) and one interior longitudinal support wall 26 (FIGS. 1, 2, 3.). Within the central housing support structure 20 is a threaded female flange fitting 22 (FIGS. 1, 2, 3.). Fitting 22, located at the back of the central housing support structure 20 accommodates a male threaded pole. The central housing support structure 20 is covered with a top surface plate 32 (FIGS. 1, 2, 5.). Extending from the front support wall face 34 of the central housing support structure 20 is a plurality of deeply curved tines 2–18 (FIGS. 1, 2, 3, 4, 5.). The top surfaces of all tines 2–18 (FIGS. 1, 5.) are smooth. The bottom surfaces of all tines 2–18 have a lower support ridge 2a–18a (FIGS. 2, 3, 5.). These lower support ridges start at the front of the support wall face 34 (FIGS. 2, 5.) and taper out to a point near the convex tips of the tines. The center tine 10 is the longest tine. Tines 2 and 18 are equal in length, width, and curve radius. Tines 4 and 16 are equal in length, width, and curve radius. Tines 6 and 14 are equal in length, width, and curve radius. Tines 8 and 12 are equal in length, width, and curve radius. Tines 2–6 and 14–18 are all narrower than tines 8–12. The lower support ridges for all tines 2a–18a start at the front support wall 34 and taper to a point near the convex tip of each tine. The depth of the lower support ridges of tines 8a–12a are deeper at the front wall support face 34 (FIGS. 2, 3.) than the lower support ridges of tines 2a–6a and 14a–18a.

The ROOF-RAKER employs a design feature that is novel and unobvious. The tines of our device have been designed to function in a manner that allows them to self-adjust simultaneously to both planes as well as the apex of any V-shaped angle to be fund in roof construction, as well as to any horizontal pitched roof surface.

OPERATION

The ROOF-RAKER has a female flange fitting 22 at the back of the central housing support structure 20 to which a lightweight telescopic or other long pole can be connected. Once attached to a connecting pole The ROOF-RAKER is then extended to a roof to be cleared of pine straw and leaf debris by a person standing at ground level or on a ladder, eliminating or minimizing the need to climb and walk on a pitched roof. When The ROOF-RAKER is placed on a flat pitched roof plane, tines 2–18 align horizontally to that surface. When The ROOF-RAKER is lowered into a recessed V-shaped roof angle where two roof planes meet, tines 2–8 and 12–18 flex and form simultaneously to both planes of such V-shaped angle. As tines 2–8 and 12–18 are forming to both planes of a V-shaped angle the center tine 10, which is the longest tine, descends into the apex of the angle as slight pressure is applied to the upper surface of connecting pole. To complete the operation the user then slowly draws pole downward, gathering and tumbling pine straw and leaf debris to and off edae of roof. The deeply curved design and structure of tines 2–18 facilitate this clearing action.

We claim:

1. A self-adjusting roof-rake head for use in safely and efficiently removing pine straw and leaf debris from roofs of houses, comprising:

a) a central housing support structure, a plurality of deeply curved, flexible tines, and a female flange fitting, all integrally formed as a one-piece injection molded unit made of lightweight material;

b) said central housing support structure having a top surface plate, a rear support wall, a convex front support wall, a female flange fitting, and non-parallel side support walls;

c) said rear support wall having an opening containing a female flange fitting, whereby a threaded pole can be attached allowing for safe and efficient removal of debris from pitched roof surfaces;

d) said plurality of tines extending from the convex front support wall and curved along approximately half of their length from a mid-section to the tips, the tines having no contact with each other along their entire length and forming an elongated diamond pattern with a longest center tine and progressively shorter tines on both sides thereof with shortest tines located at each end furthest from the center tine, whereby the central housing support structure and tines can be lowered into an apex of a V-shaped roof angle at an intersection of two roof surfaces, allowing the tines to adjust and flex upon descent into the apex, in order to gather debris simultaneously from both roof surfaces and the apex and remove the debris to a roof edge with a single downward pulling motion;

e) said tines varying in length, width, and curved radius, the tines directly adjacent to the center tine approximately equal in width to the center tine and the remaining tines having a narrower width, said tines having a top surface and a bottom surface, each bottom surface having a lower support ridge located along a center axis of the tine, said lower support ridges having a width narrower than the top surface, said lower support ridges extending from the front support wall and tapering to a point proximate each tine tip, whereby the tines can flex at different angles to the convex front wall and roof surfaces simultaneously and then assume an initial horizontal, unflexed alignment and spacing from one another after debris removal.

* * * * *